(12) United States Patent
Franklin et al.

(10) Patent No.: US 6,889,170 B1
(45) Date of Patent: May 3, 2005

(54) DATA LOG SMOOTH PATCHING

(75) Inventors: Mark H. Franklin, Aurora, CO (US);
Keith A. Thompson, Denver, CO (US)

(73) Assignee: Petroleum Software Technologies, LLC., Aurora, CO (US)

( * ) Notice: Subject to any disclaimer, the term of this patent is extended or adjusted under 35 U.S.C. 154(b) by 113 days.

(21) Appl. No.: 10/439,459

(22) Filed: May 16, 2003

Related U.S. Application Data (60) Provisional application No. 60/386,237, filed on Jun. 4, 2002.

(51) Int. Cl.[7] .............................................. G06F 19/00
(52) U.S. Cl. .......................................... 702/187; 707/1
(58) Field of Search ................................ 702/187, 186, 702/185, 57–59, 79–82, 90, 94, 95, 119; 707/1, 100, 200

(56) References Cited

U.S. PATENT DOCUMENTS 5,926,777 A * 7/1999 Vink et al. .................. 702/130

2003/0149743 A1 * 8/2003 Baluja et al. ............... 709/217

* cited by examiner

Primary Examiner—Edward Raymond
(74) Attorney, Agent, or Firm—Swanson & Bratschun, LLC (57) ABSTRACT

A method and apparatus are provided for patching defective sections of recorded data (logs) so that a substantially smooth transitions are created between the log being patched and the patched section. After logs are obtained and a reference log generated by a computer, a user compares the logs with the reference log and decides if there are sections of any log which are defective. If so, the user selects a type of patching, manual (interactive patching) or substantially automatic (criteria patching) and enters parameter values. The computer then executes the selected patching routine and displays the results. If desired, the user may modify any of the parameters until the results are satisfactory with smooth transitions between the patched section and the remaining log.

27 Claims, 6 Drawing Sheets

DATA LOG SMOOTH PATCHING

RELATED APPLICATION DATA

This application claims benefit of provisional application Ser. No. 60/386,237 entitled 'Data Log Smooth Patching', filed on Jun. 4, 2002.

FIELD OF INVENTION

The present invention relates to processing data derived from recordings (called "logs") and, in particular, to patching portions of a log which are defective due to inaccuracies or other deficiencies in the data.

BACKGROUND OF THE INVENTION

Certain portions of logs may be defective. For example, in many types of information logging, such as borehole logging in the oil and gas industry, data from multiple channels are collected simultaneously against a reference such as time or depth below the surface. Due to inaccuracies in the logging tools, imperfect logging conditions or other reasons, some sections of the logs may be defective and must be repaired or "patched" in order to make complete and accurate interpretations of the data.

As part of the repair process, a reference log is derived or synthesized from channels other than the one under scrutiny. It is known that some of the logs have features which substantially correlate with each other. These features, if viewed in plotted form, would appear as similar shapes. Regression analysis, artificial neural networks or other methods may be applied to data from some of the other channels to generate a reference log having a value at each data point which can be used as a reference to compare to individual logs. By generating the reference log from data from some of the other, less-affected channels, the reference log should not have most of the defects which may appear in any of the individual logs.

Past methods of patching a defective section of a log have included manually replacing the actual data points in the defective section of the original log with corresponding data points from the reference log. While the resulting log may be more accurate than the original log, it may still be defective, especially at the beginning and ending (upper and lower) limits (or end points) of the substituted section; that is, where the substituted section "joins" the rest of the log. Moreover, such a manual technique may be time consuming and tedious. Consequently, further refinements in patching are desirable.

SUMMARY OF THE INVENTION

The present invention provides a method and apparatus for patching defective sections of logs so that substantially smooth transitions are created between the log being patched and the patched section. In one embodiment, a data log processing system is provided, including a display device, a user input device, a storage device, a processor and a processor-executable program. The program includes instructions to obtain and display a log from data channels (ORIG log), generate and display a reference (REF) log having data points corresponding to data points in the ORIG log and receive a range of data points (a patch selection) in the ORIG log which are to be patched. The patch selection has data points at upper and lower limits of the patch selection.

The program further includes instructions to calculate a top offset as the difference between the value of the upper data point in the patch selection and the value of the corresponding data point in the REF log; a bottom offset is similarly calculated. Then, a patch slope is calculated, being the quotient of the difference between the top and bottom offsets divided by the number of data points in the patch selection. For each data point in the patch selection, the distance between the data point and the upper limit is determined and multiplied by the patch slope. The resulting product is added to the top offset to which is added the value of the data point. The resulting value becomes a data point in the smooth, resulting (RES) log.

After the data points in the RES log have been calculated, the instructions direct that the RES log be displayed on the display device. The user has the opportunity to modify any parameters until the RES log is acceptable; the data may then be saved.

In one embodiment, the instructions to receive a range of data points to be patched includes instructions to receive data points selected by the user. The program may also include instructions to receive an input establishing a transition interval around the patch selection to enhance the smoothness of the RES log. In another embodiment, the instructions to receive a range of data points to be patched includes instructions to receive an input delta value, calculate an offset value between each data point in the ORIG log and the corresponding data point in the REF log and compare the offset value with the delta value. If the magnitude of the offset is greater than the delta value, then the data point is sufficiently inconsistent with the REF log that it is included in the patch selection and is then processed automatically with little or no further user input.

DETAILED DESCRIPTION OF THE INVENTION

Selection of Section to be Patched

Figure 1A:
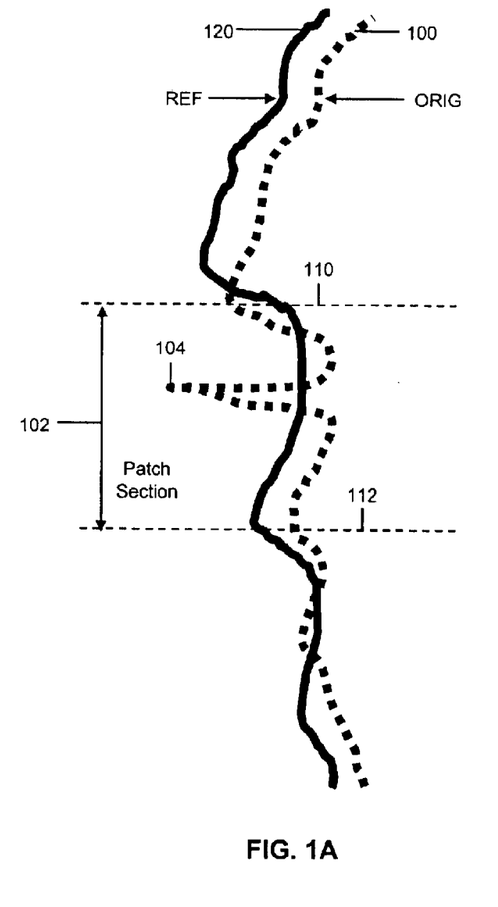
FIG. 1A is a plot of an exemplary original (ORIG) log from a logging channel and a plot of a corresponding reference (REF) log.
Figure 2:
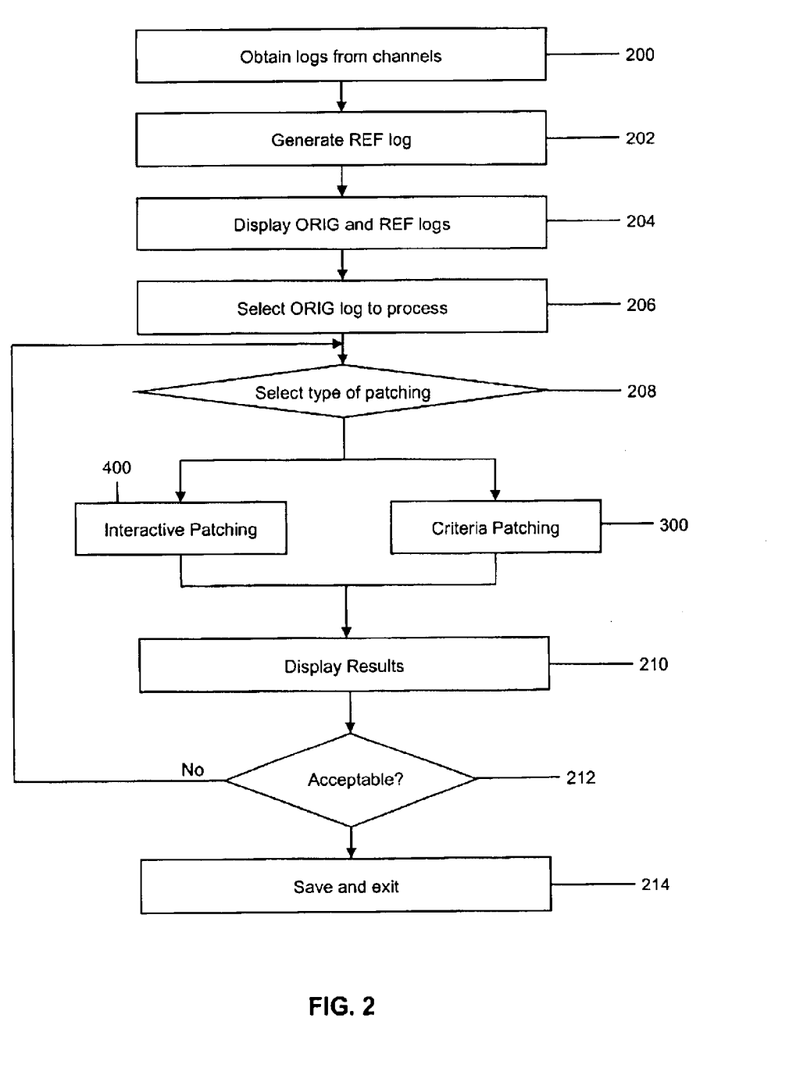
FIG. 2 is a high level flow chart of the smooth patching method of the present invention.
Figure 6:
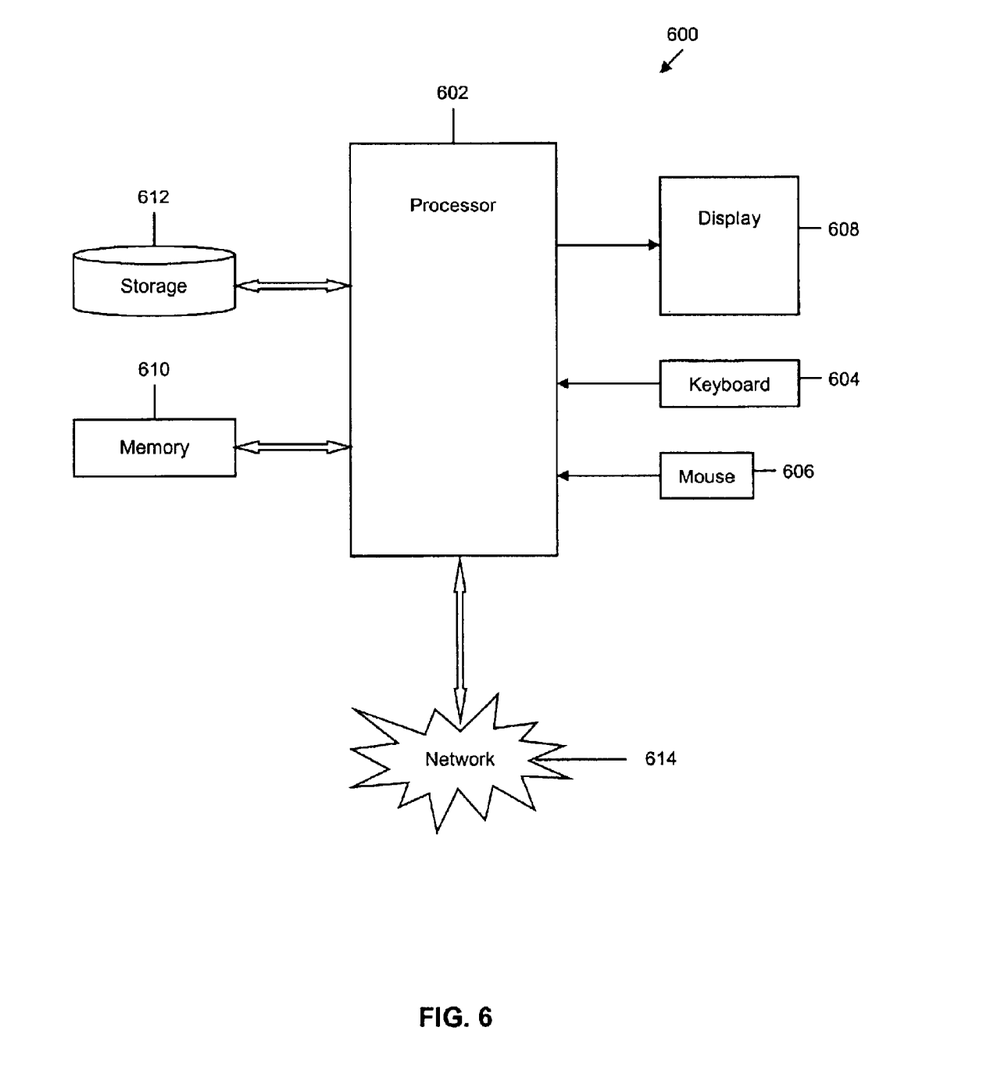
FIG. 6 is a block diagram of a computer system which may be used to execute the patch smoothing program of the present invention.

Referring to the flowchart of FIG. 2, after the logging data from the channels have been obtained 200 and a reference log generated 202, a data interpreter (hereinafter referred to as the "user") runs a computer program. As illustrated in FIG. 6, the computer 600 may include a program processing unit 602, data entry devices, such as a keyboard 604 and mouse 606, a display unit 608, and storage units, such as memory 610 and hard disks 612, in which to store the program instructions. If desired, the computer system 600 may be interconnected with a network 614, thereby allowing the user to process logs from a location remote from the location of the actual logging data. Plots of the data logs and the reference log are displayed 204. The user then selects a log to process 206 and selects which of two general methods of patching is to be used 208. FIG. 1A illustrates an exemplary channel log ("ORIG") 100 and a corresponding reference log ("REF") 120. In this plot of logging data, vertical distance on the logs represents depth below the surface. As can be seen from FIG. 1A, a section 102 of the ORIG log 100 has a spike 104 which an experienced interpreter will know was most likely caused by inaccuracies in the logging tools, imperfect logging conditions or other reasons. A comparison with the REF log 120 is further evidence that the spike 104 is inconsistent with the expected log response under ideal conditions. Therefore, the spike 104, along with adjacent portions of the log 106 and 108, will need to be corrected or patched. Additional data channel logs may also be selected for display to assist the user in determining the quality of the ORIG log 100.

Figure 3:
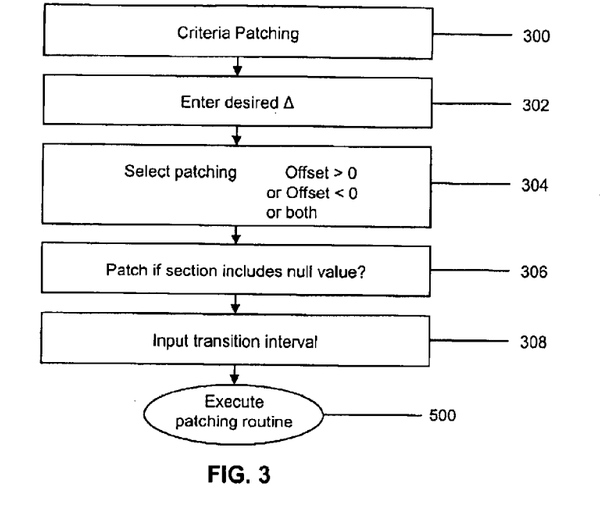
FIG. 3 is a flow chart of the Criteria Selection method of the present invention.

Selection of the section(s) of the ORIG log 100 to be patched may be automatic ("Criteria Selection") 300 or manual ("Interactive Selection") 400. If Criteria Selection 300 is chosen (FIG. 3), the user inputs into the computer 600 a delta value 302 to indicate the amount by which a data point on the ORIG log 100 must differ from the corresponding data point on the REF log 120 before it is deemed to be defective. Other parameters may also be entered. For example, the user may wish for a data point in the ORIG log to be corrected only if its value is greater than the value of the corresponding REF log data point (and the absolute value or magnitude of the difference or "offset" between the two is greater than the delta 302), or only if its value is less, or in either case 304. The user may also want to patch only if the selected section 102 does not contain any null values 306. The user may also enter a transition interval 308 to dictate how far to extend the patch above and below the region that is defined by the difference between the ORIG and REF curves. Such a transition aids in producing a smoother resulting log.

Figure 1B:
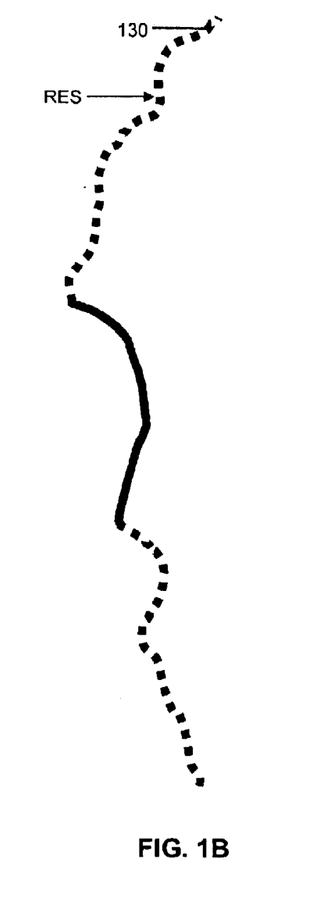
FIG. 1B is a plot of a resulting (RES) log following the application of the smooth patching method of the present invention.

When the program executes, the instructions direct the processor 602 to compare each data point on the ORIG log with the corresponding data point on the REF log (that is, the reference data point at the same depth as the original data point). Those sections of the ORIG log 100 where the magnitude of the difference (the "offset") in data values between the ORIG log 100 and the REF log 120 is greater than the delta value 302 will be patched by the program using the routine 500 described below with respect to FIG. 5. If the resulting ("RES") log 130, shown in FIG. 1B, is not acceptable 212, the user may be offered the opportunity to modify any of the parameters and re-run the patching routine 500.

If Interactive patching 400 is chosen (FIG. 4), the user may choose the mode of interactive patching desired 402: Depth only 410, Value and Depth 420, or Continuous Value and Depth 430. If the user chooses the Depth only mode 410, the user first manually selects the portion(s) of the original log to be patched 412, such as by marking the end points with an on-screen cursor or by entering the upper and lower depth limits 110 and 112 of the section to be patched 102. Then, the program executes the smoothing routine 500 without further user input.

Figure 4:
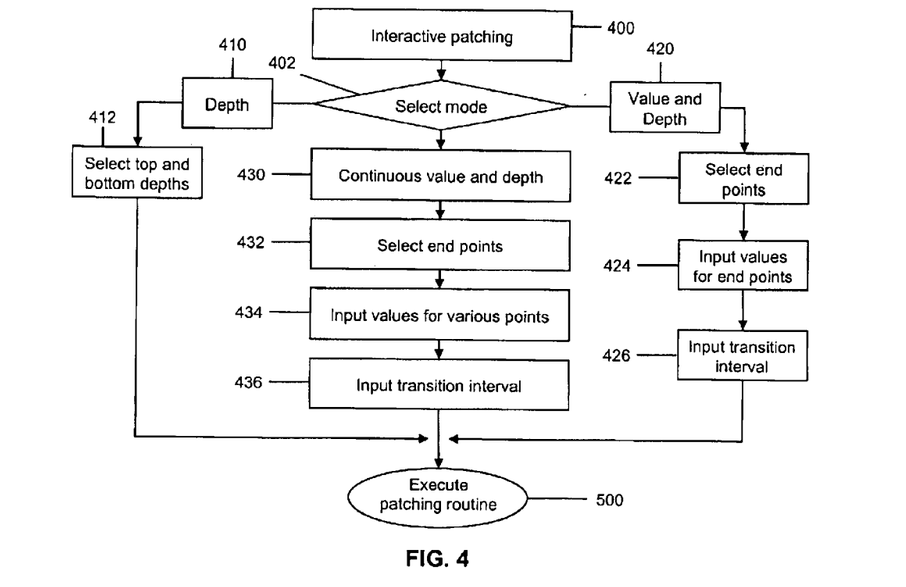
FIG. 4 is a flow chart of the Interactive Selection method of the present invention.

If the user believes that the REF log 120 may also be defective at either or both of the end points 110 and 112, the Value and Depth mode 420 may be chosen. The user first selects the portion(s) 102 of the ORIG log 100 to be patched 422. The user then enters the values to assign to the end points 110 and 112 of each section 102 to be patched 424 and how far into adjacent sections of the log to extend the transition to effect a gradual merging of the patched section 102 into the adjacent areas of the ORIG log 426. In order to provide a smooth transition at each end of the patched section 102, there is a gradual shift toward the value which the user assigns at the end points 110 and 112 over the transition interval specified by the user. The patching routine is then executed 500.

For even greater control over the process, the user may select the Continuous Value and Depth mode 430 of Interactive Selection 400. After marking or otherwise indicating the end points 110 and 112 of each section to be patched 432, the user may enter values 434 to assign for various points within the section 102. Between each pair of adjacent selected points, the program will copy the shape of a corresponding section of the REF log 120 into the ORIG log 100. As in the Value and Depth mode 420, the user in the Continuous Value and Depth mode 430 has the ability to control the transition length around the top and bottom end points 110 and 112 of each section 102 to be patched 436 and the patching routine is executed 500.

After the patching routine 500 has completed, a repaired or resulting log (RES) 130 is displayed 440. If the RES log 130 generated by any of the patching modes, interactive or criteria, is not acceptable 212, the user is offered the opportunity to modify any of the parameters and re-run the patching routine 500. Otherwise, the results are saved and the user may process another log or may exit 214.

Smooth Patching

Figure 1C:
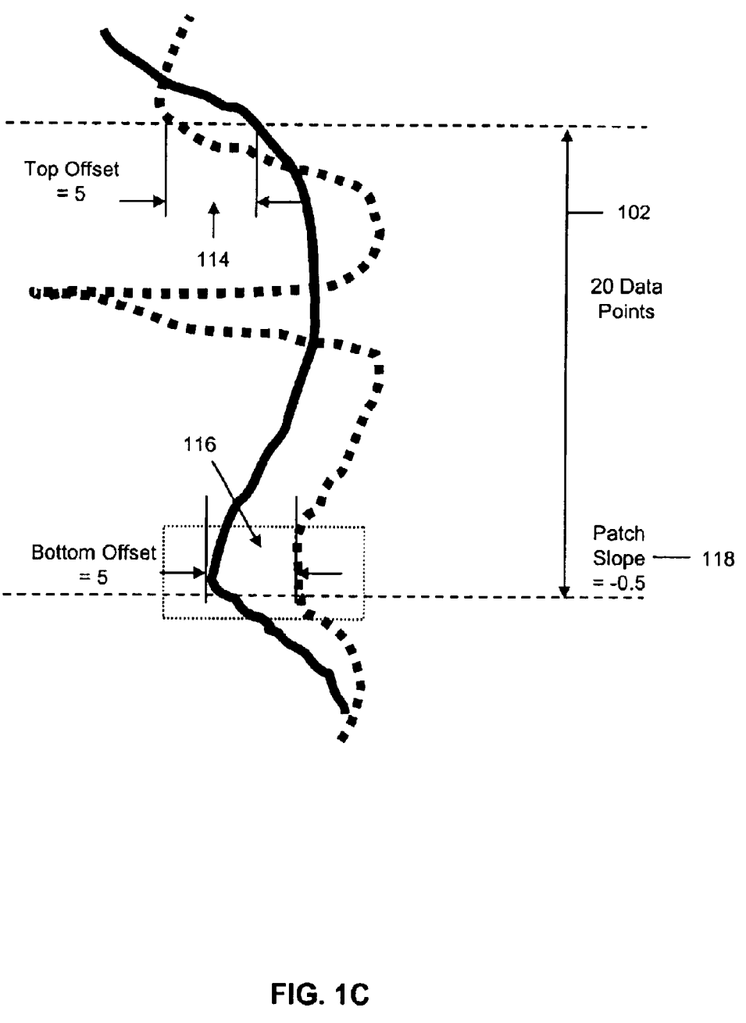
FIG. 1C is an expanded plot of a defective section of the logs of FIG. 1A.
Figure 5:
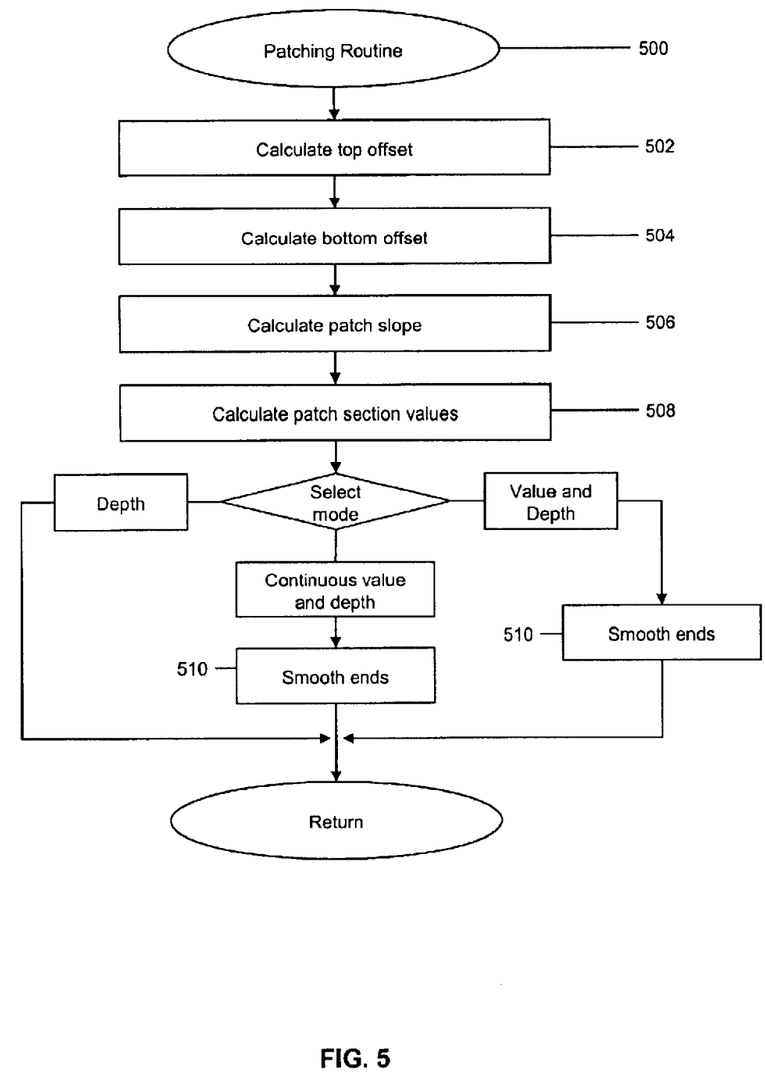
FIG. 5 is a flow chart of the Smoothing algorithm of the present invention.

After the user has entered the necessary information for either the Criteria Selection 300 or the Interactive Selection 400, the computer begins the smooth patching process 500 (FIG. 5). First, the value of the data point of the original log at the top 110 of the section 102 to be patched is determined and is subtracted from the value at the top of the corresponding section of the reference log 502; the difference is the "top offset". Next, the value of the point of the original log at the bottom 112 of the section 102 to be patched is determined and is subtracted from the value at the bottom of the corresponding section of the reference log 504; the difference is the "bottom offset". The "patch slope" is then calculated 506 by subtracting the top offset from the bottom offset and dividing the result by the number of data points in the section to be patched. FIG. 1C illustrates the top offset 114 and bottom offset 116 and the patch slope 118, based upon an exemplary selected section 102 of twenty data points. Finally, for every data point in the section to be patched 102, the distance of the point from the top of the section is multiplied by the patch slope, the product is added to the top offset, and the sum is added to the value of the corresponding point on the reference log 508. When plotted, these final sums for the data points become the resulting log (RES) 130 (FIG. 1B), patched with smooth transitions to the ORIG log (FIG. 1A). After the RES log 130 is displayed 210, the user has the opportunity to accept of change the results 212. Once satisfied, the user may save the results and exit the program 214.

As will be appreciated, the patch smoothing method and apparatus may be employed with logs other than those which are generating from logging data in the oil and gas industry. For example, laboratory analysis of various components of a patient's blood may be plotted on a set of logs over a period of time. Smooth patching may be used to correct defects in any of the logs.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A data log processing system, comprising:
   a display device;
   a user input device;
   a storage device;
   a processor programmed to execute a program stored in the storage device; and
   a processor-executable program stored on the storage device, comprising instructions to:
      obtain and display an ORIG log from data channels, the ORIG log comprising ORIG data points;
      generate and display a reference (REF) log comprising REF data points corresponding to ORIG data points;
      receive a range of ORIG data points of a patch selection, the patch selection having upper and lower limits represented by upper and lower data points, respectively;
      calculate a top offset value as a difference between a value of the upper data point and a value of a corresponding REF data point;
      calculate a bottom offset value as a difference between the value of the lower data point and a value of a corresponding REF data point;
      calculate a patch slope as a quotient of a difference between the top offset and the bottom offset divided by the number of data points in the patch selection;
      for each data point in the patch selection:
         determine a distance between the data point on the patch selection and the upper data point;
         multiply the determined distance by the patch slope to obtain a product;
         add the top offset to the product to obtain an intermediate value; and
         add the intermediate value to the value of the data point in the patch selection to obtain a value of a corresponding data point in a resulting (RES) log; and
      display the RES log on the display device;
      receive an input indicating if the RES log is acceptable;
      if the input indicates that the results are not acceptable, allow changes to parameter values to be made; and
      if the input indicates that the results are acceptable, save the results.

2. The data log processing system of claim 1, wherein the instructions to receive a range of ORIG data points comprises instructions to:
   receive an input establishing a delta value;
   calculate an offset value as a difference between a value of each data point in the patch selection and a corresponding REF data point;
   compare each offset value with the delta value; and
   send a data point to the first calculation instruction be patched if the magnitude of the offset value of the ORIG data point is greater than the delta value.

3. The data log processing system of claim 1, wherein the instructions to receive a range of ORIG data points comprises instructions to:
   receive an input from a user indicating at least one data point of the ORIG log to be patched, a plurality of adjacent data points being the patch selection; and
   send a data point to the first calculation instruction be patched.

4. The data log processing system of claim 3, wherein the instruction to receive an input from the user indicating at least one data point of the ORIG log to be patched comprises receiving an input from the user indicating upper and lower (top and bottom) limits to the patch section.

5. The data log processing system of claim 4, further comprising instructions to receive an input from the user assigning values to the data points at the top and bottom limits.

6. The data log processing system of claim 4, further comprising instructions to receive an input from the user assigning values to selected data points in the patch selection.

7. The data log processing system of claim 4, further comprising instructions to:
   receive an input establishing a transition interval above and below the data points at the top and bottom limits; and
   process data points in the transition interval.

8. The data log processing system of claim 7, wherein the instructions to process data points in the transition interval comprise:
   calculating a weighted average of an ORIG data point and the corresponding REF data point; and
   inserting the calculated weighted average as a corresponding data point in the RES log.

9. A method for patching defects in a data log, comprising:
   obtaining and displaying an ORIG log from data channels, the ORIG log comprising ORIG data points;
   generating and displaying a reference (REF) log comprising REF data points corresponding to ORIG data points;
   receiving a range of ORIG data points of a patch selection, the patch selection having upper and lower limits represented by upper and lower data points, respectively;
   calculating a top offset value as a difference between a value of the upper data point and a value of a corresponding REF data point;
   calculating a bottom offset value as a difference between the value of the lower data point and a value of a corresponding REF data point;
   calculating a patch slope as a quotient of a difference between the top offset and the bottom offset divided by the number of data points in the patch selection;
   for each data point in the patch selection:
      determining a distance between the data point on the patch selection and the upper data point;
      multiplying the determined distance by the patch slope to obtain a product;
      adding the top offset to the product to obtain an intermediate value; and
      adding the intermediate value to the value of the data point in the patch selection to obtain a value of a corresponding data point in a resulting (RES) log; and
   displaying the RES log on a display device;
   receiving an input indicating if the RES log is acceptable;
   if the input indicates that the results are not acceptable, allowing changes to parameter values to be made; and
   if the input indicates that the results are acceptable, saving the results.

10. The method of claim 9, wherein receiving a range of ORIG data points comprises:
   receiving an input establishing a delta value;
   calculating an offset value as a difference between a value of each data point in the patch selection and a corresponding REF data point;
   comparing each offset value with the delta value; and
   sending a data point to the first calculation instruction be patched if the magnitude of the offset value of the ORIG data point is greater than the delta value.

11. The method of claim 9, wherein receiving a range of ORIG data points comprises:
   receiving an input from a user indicating at least one data point of the ORIG log to be patched, a plurality of adjacent data points being the patch selection; and
   sending a data point to the first calculation instruction be patched.

12. The method of claim 11, wherein receiving an input from the user indicating at least one data point of the ORIG log to be patched comprises receiving an input from the user indicating upper and lower (top and bottom) limits to the patch section.

13. The method of claim 12, further comprising receiving an input from the user assigning values to the data points at the top and bottom limits.

14. The method of claim 12, further comprising receiving an input from the user assigning values to selected data points in the patch selection.

15. The method of claim 12, further comprising:
   receiving an input establishing a transition interval above and below the data points at the top and bottom limits; and
   processing data points in the transition interval.

16. The method of claim 15, wherein processing data points in the transition interval comprises:
   calculating a weighted average of an ORIG data point and the corresponding REF data point; and
   inserting the calculated weighted average as a corresponding data point in the RES log.

17. A data log processing system, comprising:
   a display device;
   a user input device;
   a storage device;
   a processor programmed to execute a program stored in the storage device; and
   a processor-executable program stored on the storage device, comprising:
      a preliminary processing module, operable to:
         obtain logs from channels;
         generate a reference (REF) log;
         display original (ORIG) and REF logs;
         receive an input selecting an ORIG log to process; and
         receive an input designating a type of patching to be performed;
      a criteria selection module, operable to:
         receive an input establishing a delta value;
         calculate an offset value as a difference between each data point in the selected ORIG log and a corresponding data point in the REF log;
         compare each offset value with the delta value; and
         send a data point to be patched if the magnitude of the offset value of the data point is greater than the delta value, a plurality of adjacent data points being a patch selection;
      a interactive selection module, operable to:
         receive an input from a user indicating at least one data point of the ORIG log to be patched, a plurality of adjacent data points being a patch selection; and
         send the indicated data points to be patched;
      a patching module, operable to:
         receive data points of a patch selection, the number of data points in the patch selection being N;
         calculate a top offset value as a difference between a value of a data point at a top of the patch selection and a value of a corresponding data point in the REF log;
         calculate a bottom offset value as a difference between a value of a data point at a bottom of the patch selection and a value of a corresponding data point in the REF log;
         calculate a patch slope as a quotient of a difference between the top offset and the bottom offset divided by N; and
         for each data point in the patch selection:
            determine a distance between the data point on the ORIG log and the data point at the top of the patch selection;
            multiply by the determined distance by the patch slope to obtain a product;
            add the top offset to the product to obtain an intermediate value; and
            add the intermediate value to the value of the data point in the REF log corresponding to the data point in the patch selection to obtain a value of a data point in a resulting (RES) log corresponding to the data point in the patch selection; and
      the preliminary processing module further operable to:
         display the RES log on the display device;
         receive an input indicating if the RES log is acceptable;
         if the input indicates that the results are not acceptable, allow changes to parameter values to be made; and
         if the input indicates that the results are acceptable, save the results.

18. The data log processing system of claim 17, further comprising instructions to:
   receive an input establishing a transition interval above and below the data points at the top and bottom limits; and
   process data points in the transition interval.

19. The data log processing system of claim 17, wherein the instructions to process data points in the transition interval comprise:
   calculating a weighted average of an ORIG data point and the corresponding REF data point; and
   inserting the calculated weighted average as a corresponding data point in the RES log.

20. A computer-readable program storage device tangibly embodying a program executable by the computer and comprising instructions for:
   obtaining and displaying an ORIG log from data channels, the ORIG log comprising ORIG data points;
   generating and displaying a reference (REF) log comprising REF data points corresponding to ORIG data points;
   receiving a range of ORIG data points of a patch selection, the patch selection having upper and lower limits represented by upper and lower data points, respectively;

calculating a top offset value as a difference between a value of the upper data point and a value of a corresponding REF data point;

calculating a bottom offset value as a difference between the value of the lower data point and a value of a corresponding REF data point;

calculating a patch slope as a quotient of a difference between the top offset and the bottom offset divided by the number of data points in the patch selection;

for each data point in the patch selection:
   determining a distance between the data point on the patch selection and the upper data point;
   multiplying the determined distance by the patch slope to obtain a product;
   adding the top offset to the product to obtain an intermediate value; and
   adding the intermediate value to the value of the data point in the patch selection to obtain a value of a corresponding data point in a resulting (RES) log; and displaying the RES log on a display device;

receiving an input indicating if the RES log is acceptable;

if the input indicates that the results are not acceptable, allowing changes to parameter values to be made; and if the input indicates that the results are acceptable, saving the results.

21. The computer-readable program storage device of claim 20, wherein the instruction for receiving a range of ORIG data points comprises instructions for:

receiving an input establishing a delta value;

calculating an offset value as a difference between a value of each data point in the patch selection and a corresponding REF data point;

comparing each offset value with the delta value; and sending a data point to the first calculation instruction be patched if the magnitude of the offset value of the ORIG data point is greater than the delta value.

22. The computer-readable program storage device of claim 20, wherein the instruction for receiving a range of ORIG data points comprises instructions for:

receiving an input from a user indicating at least one data point of the ORIG log to be patched, a plurality of adjacent data points being the patch selection; and sending a data point to the first calculation instruction be patched.

23. The computer-readable program storage device of claim 22, wherein the instruction for receiving an input from the user indicating at least one data point of the ORIG log to be patched comprises an instruction for receiving an input from the user indicating upper and lower (top and bottom) limits to the patch section.

24. The computer-readable program storage device of claim 23, the program further comprising an instruction for receiving an input from the user assigning values to the data points at the top and bottom limits.

25. The computer-readable program storage device of claim 23, the program further comprising an instruction for receiving an input from the user assigning values to selected data points in the patch selection.

26. The computer-readable program storage device of claim 23, the program further comprising instructions for:

receiving an input establishing a transition interval above and below the data points at the top and bottom limits; and processing data points in the transition interval.

27. The computer-readable program storage device of claim 26, wherein the instruction for processing data points in the transition interval comprises instructions for:

calculating a weighted average of an ORIG data point and the corresponding REF data point; and inserting the calculated weighted average as a corresponding data point in the RES log.

* * * * *

UNITED STATES PATENT AND TRADEMARK OFFICE
CERTIFICATE OF CORRECTION

PATENT NO. : 6,889,170 B1
DATED : May 3, 2005
INVENTOR(S) : Franklin, Mark H. and Thompson, Keith A.

It is certified that error appears in the above-identified patent and that said Letters Patent is hereby corrected as shown below:

Column 4,
Line 56, "accept of change" should read -- accept or change --.

Column 5,
Line 59, "instruction be" should read -- instruction to be --.

Column 6,
Line 1, "instruction be" should read -- instruction to be --.

Column 7,
Lines 8 and 17, "instruction be" should read -- instruction to be --.

Column 9,
Line 37, "instruction be" should read -- instruction to be --.

Column 10,
Line 7, "instruction be" should read -- instruction to be --.

Signed and Sealed this

Twenty-third Day of August, 2005

JON W. DUDAS
*Director of the United States Patent and Trademark Office*